United States Patent
Taguchi

(10) Patent No.: US 9,440,726 B2
(45) Date of Patent: Sep. 13, 2016

(54) JOINING STRUCTURE FOR INTERIOR PANEL FOR AIRCRAFT

(71) Applicant: The Yokohama Rubber Co., LTD., Minato-ku, Tokyo (JP)

(72) Inventor: Yuji Taguchi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/652,448

(22) PCT Filed: Dec. 18, 2013

(86) PCT No.: PCT/JP2013/007426
§ 371 (c)(1),
(2) Date: Jun. 15, 2015

(87) PCT Pub. No.: WO2014/097619
PCT Pub. Date: Jun. 26, 2014

(65) Prior Publication Data
US 2015/0329192 A1    Nov. 19, 2015

(30) Foreign Application Priority Data

Dec. 19, 2012    (JP) .................................. 2012-276374

(51) Int. Cl.
*B64C 1/06* (2006.01)
*B64C 1/12* (2006.01)
(Continued)

(52) U.S. Cl.
CPC ................. *B64C 1/066* (2013.01); *B64C 1/12* (2013.01); *B64D 11/00* (2013.01); *F16B 11/006* (2013.01); *Y02T 50/46* (2013.01)

(58) Field of Classification Search
CPC ......... B64D 11/00; B64C 1/12; B64C 1/006; F16B 11/006
See application file for complete search history.

(56) References Cited

U.S. PATENT DOCUMENTS

| 4,671,470 A * | 6/1987 | Jonas ................ B29C 66/43461 244/119 |
| 5,212,003 A * | 5/1993 | Homer ....................... F16B 5/01 428/116 |

(Continued)

FOREIGN PATENT DOCUMENTS

| JP | H09-131817 | 5/1997 |
| JP | 2004-179730 | 6/2004 |

(Continued)

OTHER PUBLICATIONS

International Search Report for International Application No. PCT/JP2013/007426 dated Apr. 1, 2014, 4 pages, Japan.

*Primary Examiner* — Philip J Bonzell
(74) *Attorney, Agent, or Firm* — Thorpe North & Western

(57) ABSTRACT

A joining structure for an interior panel for an aircraft includes two interior panels, each provided with a corner portion formed on an internal-side surface plate by an edge of an end portion of an external-side surface plate and an edge of an end portion of an internal-side surface plate being attached, the corner portion extending in the direction the edges extend. Strip-shaped connection pieces are provided at the corner portion and are formed across an entire length of the corner portion by a portion, with gaps between the strip-shaped connection pieces. The two interior panels are joined when brought together, with the connection pieces of the two interior panels passing through the gaps between the connection pieces of the other interior panels and being adhered to the external-side surface plate of the other interior panels by an adhesive.

14 Claims, 14 Drawing Sheets

(51) Int. Cl.
    *B64D 11/00*    (2006.01)
    *F16B 11/00*    (2006.01)

(56) References Cited

U.S. PATENT DOCUMENTS 6,789,367 B1    9/2004   Dando

2012/0219355 A1    8/2012   Masuda

FOREIGN PATENT DOCUMENTS

| | | |
|---|---|---|
| JP | 2009-073311 | 4/2009 |
| JP | 2012-171568 | 9/2012 |
| WO | WO 00/47903 | 8/2000 |

* cited by examiner

JOINING STRUCTURE FOR INTERIOR PANEL FOR AIRCRAFT

TECHNICAL FIELD

The present technology relates to a joining structure for an interior panel for an aircraft, the interior panel being installed inside an aircraft.

BACKGROUND

A lavatory unit, a galley, a hand baggage storage shelf, a divider, and the like are arranged inside an aircraft. For example, with respect to the lavatory unit, a housing, which partitions the lavatory, is formed by a plurality of interior panels for an aircraft being joined together. With respect to the galley and the hand baggage storage space, a housing, which partitions the goods storage space, is formed by the plurality of interior panels for an aircraft being joined together, and the divider is formed by the plurality of interior panels for an aircraft being joined together, the plurality of interior panels forming partition plates.

These interior panels for an aircraft, which are used inside an aircraft, are formed by lightweight and rigid panels from the perspective of realizing reduction in weight.

In many cases, such an interior panel is formed by a honeycomb structured core formed of synthetic resin and by surface plates formed of fiber reinforced plastic, reinforced plastic, or metal being adhered to both sides of the core.

Then, when the interior panels for an aircraft are joined together, a metal reinforcing frame having an L-shaped cross-section is arranged at an intersection portion at which the two interior panels for an aircraft intersect, metal insert nuts are embedded in end portions of the interior panels for an aircraft, and metal bolts, which are inserted through attachment holes of the reinforcing frame, are screwed into the insert nuts.

However, with a conventional joining structure as described above, as metal reinforcing frames, metal bolts, and metal insert nuts are used, there has been a disadvantage that the weight of the joining structure increases.

Furthermore, as it is necessary to reinforce sections of the interior panel for an aircraft in which the insert nuts are embedded, the number of parts increases and assembly has become more time-consuming, and there is a disadvantage in terms of realizing cost reduction.

SUMMARY

The present technology has been devised in light of the above-described circumstances, and provides a joining structure for an interior panel for an aircraft that is advantageous in terms of realizing reduction in weight of and cost reduction of the joining structure.

The present technology provides a joining structure for an interior panel for an aircraft including: two interior panels for an aircraft including a plate-shaped core having a uniform thickness and a first surface plate and a second surface plate attached to both sides of the core, the two interior panels for an aircraft being joined so that the first surface plates intersect with each other and the second surface plates intersect with each other. In such a joining structure, the first surface plate and the second surface plate have a flat surface portion, the flat surface portions being parallel with each other; the second surface plate has an end surface portion that protrudes from an end portion of the flat surface portion and is connected with an end portion of the flat surface portion of the first surface plate as well as the flat surface portion; a corner portion is provided by the end portion of the flat surface portion of the first surface plate and an end portion of the end surface portion of the second surface plate being attached on the first surface plate, the corner portion extending in a direction the end portions extend; a plurality of strip-shaped connection pieces are provided, the connection pieces being formed across an entire length of the corner portions of the two interior panels for an aircraft by portions of the end portion of the flat surface portion of the first surface plate protruding from the corner portion and continuously protruding from the flat surface portion of the first surface plate or by portions of the end portion of the end surface portion of the second surface plate continuously protruding from the end surface portion, and the connection pieces having gaps therebetween in a direction the corner portion extends; and the two interior panels for an aircraft are joined by the corner portions of the two interior panels for an aircraft being brought together, and the connection pieces of the two interior panels for an aircraft passing through the gaps between the connection pieces of the other interior panels for an aircraft to be joined, and being adhered to one of the second surface plate and the first surface plate of the other interior panels for an aircraft.

In the present technology, two interior panels for an aircraft can be joined using a simple structure in which the two interior panels for an aircraft are each provided with a plurality of connection pieces and the connection pieces are adhered to the other interior panel to be joined.

Therefore, the conventionally used metal reinforcing frame, metal bolts, and metal insert nuts can be omitted, and this becomes advantageous in terms of realizing reduction in weight of the joining structure.

Furthermore, as there is no need to reinforce the sections of the panels in which the insert nuts are embedded, as done conventionally and only an operation for adhering the connection pieces is required, the number of parts can be reduced and the assembly becomes easy. This is also advantageous in terms of realizing cost reduction.

DETAILED DESCRIPTION (First Embodiment)

Next, embodiments of the present technology will be described with reference to the drawings.

First, a first embodiment will be described with reference to FIGS. 1 to 4.

Figure 1:
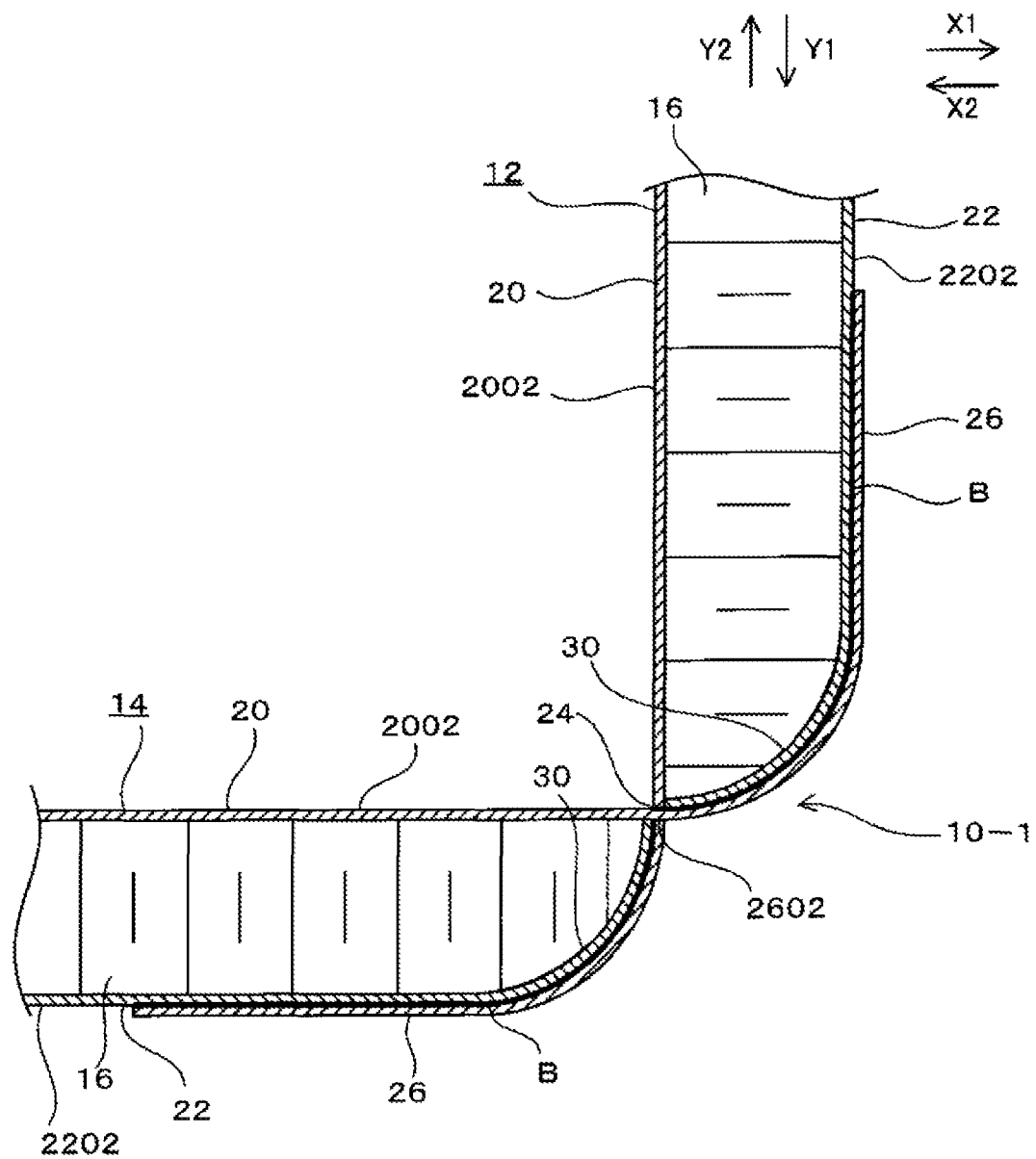
FIG. 1 is a cross-sectional view illustrating a section in which two interior panels for an aircraft are joined by a joining structure according to a first embodiment.
Figure 2:
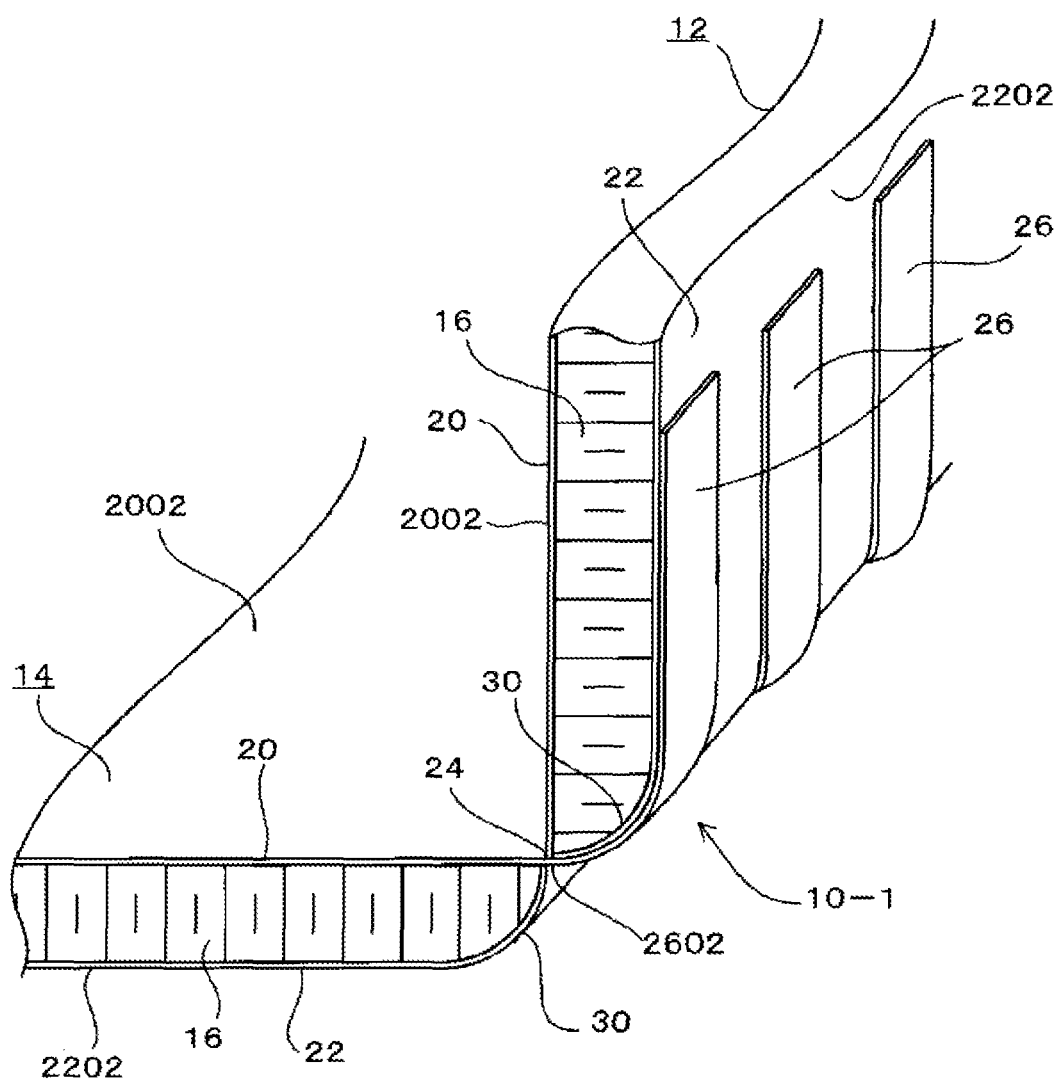
FIG. 2 is a perspective cross-sectional view illustrating the section in which the two interior panels for an aircraft are joined.
Figure 3:
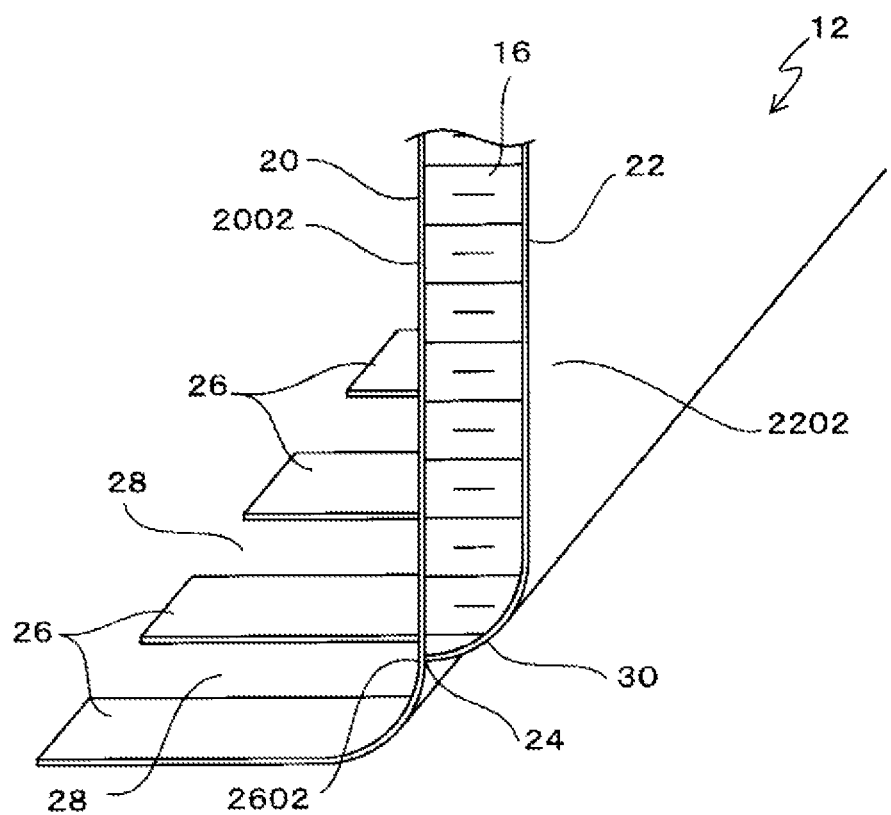
FIG. 3 is a perspective cross-sectional view illustrating an end portion of one of the interior panels for an aircraft.
Figure 4:
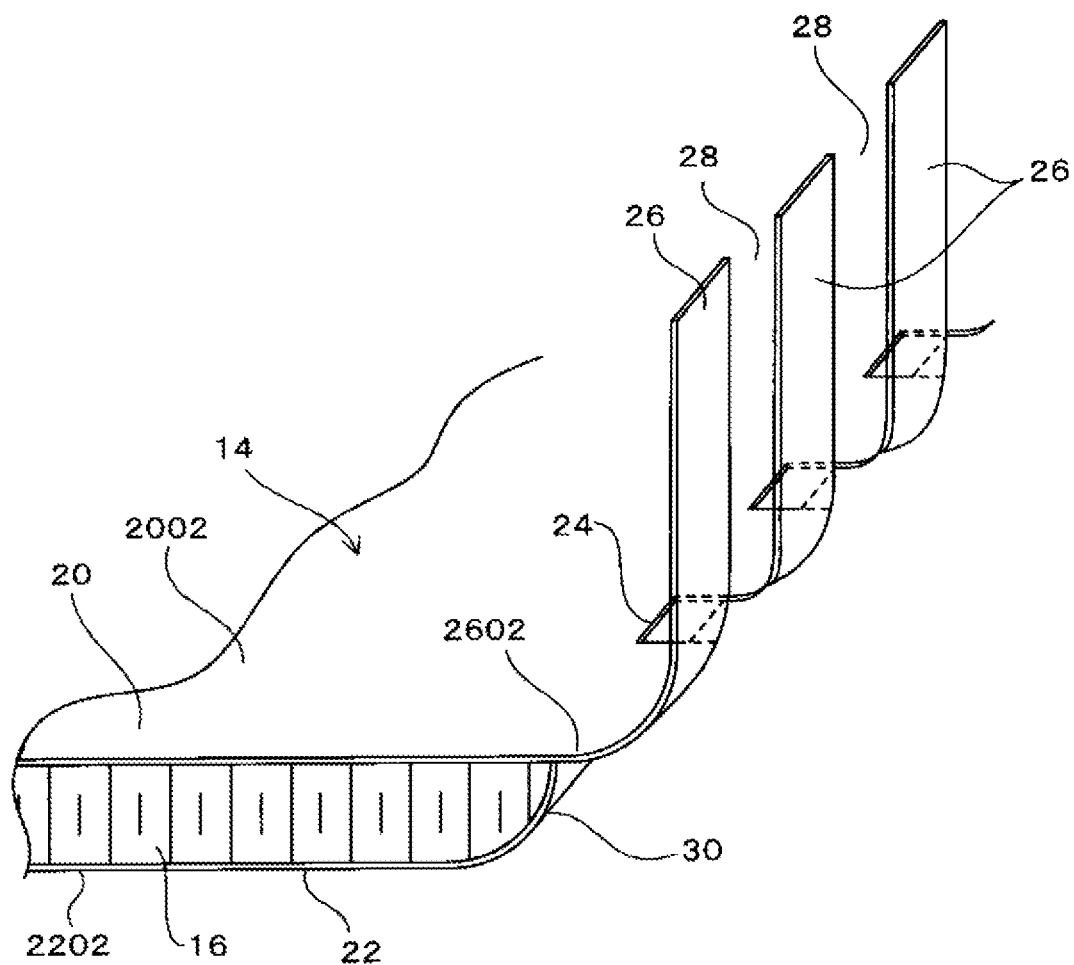
FIG. 4 is a perspective cross-sectional view illustrating an end portion of the other interior panel for an aircraft.

Two interior panels for an aircraft 12, 14 are joined by a joining structure 10-1 of the first embodiment, as illustrated in FIG. 1 and FIG. 2.

The interior panels for an aircraft 12, 14 are panels that form a housing of a lavatory unit, a galley, and a hand baggage storage space, or a partition plate of a divider, for example.

Each of the interior panels for an aircraft 12, 14 has a rectangular shape and is formed by a core 16 and an internal-side surface plate 20 and an external-side surface plate 22 that are attached to both sides of the core 16 by an adhesive, from the perspective of realizing reduction in weight while maintaining rigidity.

When the interior panels for an aircraft 12, 14 form the housing of the lavatory unit for an aircraft, for example, the internal-side surface plate 20 is used so as to be positioned inside the lavatory and the external-side surface plate 22 is used so as to be positioned outside the lavatory. Depending on the usage, the same surface plate is used for the internal-side surface plate 20 and the external-side surface plate 22.

Note that in all embodiments including the present embodiment, the internal-side surface plate 20 corresponds to a first surface plate and the external-side surface plate 22 corresponds to a second surface plate, and the two interior panels for an aircraft are joined so that the internal-side surface plates 20 intersect with each other and the external-side surface plates 22 intersect with each other.

As a material of the core 16, a honeycomb structured material formed of synthetic resin material, aluminum alloy, or the like is used, for example. The core 16 has a plate shape with a uniform thickness.

Furthermore, as the internal-side surface plate 20 and the external-side surface plate 22, for example a fiber reinforced plastic, a reinforced plastic, a lightweight metal plate formed of aluminum alloy, or the like is used. The internal-side surface plate 20 and the external-side surface plate 22 each have a uniform thickness.

Provided at the end portion (one side) of each of the two interior panels for an aircraft 12, 14 is a corner portion 24 formed by an edge of an end portion of the internal-side surface plate 20 and an edge of an end portion of the external-side surface plate 22 being attached on the internal-side surface plate 20, the corner portion 24 extending in the direction these edges extend.

At the corner portion 24, a plurality of strip-shaped connection pieces 26 are provided, the connection pieces 26 being formed across the entire length of the corner portion 24 by portions of an end portion of a flat surface portion 2002 of the internal-side surface plate 20 protruding from the corner portion 24, with gaps 28 between the strip-shaped connection pieces 26 in the direction the corner portion 24 extends.

Then, the two interior panels for an aircraft 12, 14 are joined by the corner portions 24 of the two interior panels for an aircraft 12, 14 being brought together, and the connection pieces 26 of the two interior panels for an aircraft 12, 14 passing through the gaps 28 between the connection pieces 26 of the other interior panels for an aircraft 14, 12 to be joined, and being adhered to the external-side surface plates 22 of the other interior panels for an aircraft 14, 12 by an adhesive B (see FIG. 1).

In the present embodiment, the two interior panels for an aircraft 12, 14 are joined so that the internal-side surface plates 20 intersect with each other at an angle of 90°.

Describing in more detail, the internal-side surface plate 20 is provided with the flat surface portion 2002 that has an edge at the end portion thereof, and the connection pieces 26 are formed by the portions of the end portion of the flat surface portion 2002 protruding from the corner portion 24 and continuously protruding from the flat surface portion 2002.

The external-side surface plate 22 has a flat surface portion 2202 that is parallel with the flat surface portion 2002 of the internal-side surface plate 20, and an end surface portion that protrudes from an end portion of the flat surface portion 2202 and is connected with the flat surface portion 2002 of the internal-side surface plate 20.

The end surface portion is formed as a curved surface portion 30. The curved surface portion 30 is curved so as to gradually separate from the flat surface portion 2002 of the internal-side surface plate 20 as the curved surface portion 30 separates from the corner portion 24 and is connected with the end portion of the flat surface portion 2202 so as to gradually make the thickness of the interior panels for an aircraft 12, 14 larger.

The connection pieces 26 of the two interior panels for an aircraft 12, 14 protrude with a uniform width. In more detail, the connection pieces 26 of the two interior panels for an aircraft 12, 14 have a width in the direction orthogonal to the direction the connection pieces 26 protrude and a length in the direction the connection pieces 26 protrude. When it is described that the connection pieces 26 protrude with a uniform width, this means that the width of the connection pieces 26 of the two interior panels for an aircraft 12, 14 is the same and the width is uniform along the length direction.

Furthermore, the connection pieces 26 adjacent to each other are provided with the gap 28 therebetween, the gap 28 having the same dimension as the above-described width.

The connection pieces 26 of the two interior panels for an aircraft 12, 14 pass through the gaps 28 between the connection pieces 26 of the other interior panels for an aircraft 14, 12 to be joined, and are attached by the adhesive B to the curved surface portion 30 and the flat surface portion 2202 of the external-side surface plate 22, of the other interior panels for an aircraft 14, 12.

A base portion 2602 of the connection pieces 26 protruding from the corner portion 24 does not have any bent portion, and the connection pieces 26 extend continuously from the flat surface portion 2002 of the internal-side surface plate 20.

As illustrated in FIG. 1, when a force in a direction X1 or a force in a direction X2 acts on the one interior panel for an aircraft 12, in other words, when a force in the orthogonal direction with respect to a surface of the one interior panel for an aircraft 12 acts thereon, a bending moment thus generated is released by the base portions 2602 of the connection pieces 26 of the two interior panels for an aircraft 12, 14 being bent.

More specifically, when the force in the direction X1 or X2 acts on the one interior panel for an aircraft 12, the joining structure 10-1 of the present embodiment functions as if it were a pin connection.

Furthermore, when a force in a direction Y1 acts on the one interior panel for an aircraft 12, in other words, when a force, in the direction toward a section at which the corner portions 24 of the two interior panels for an aircraft 12, 14 are brought together, acts in the direction along the surface of the one interior panel for an aircraft 12, portions of the connection pieces 26, which are attached to the curved surface portion 30 of the other interior panel for an aircraft 14, receive a compression force, so that this force is received.

Furthermore, when a force in a direction Y2 acts on the one interior panel for an aircraft 12, in other words, when a force, in the direction separating from the section at which the corner portions 24 of the two interior panels for an aircraft 12, 14 are brought together, acts in the direction along the surface of the one interior panel for an aircraft 12, the portions of the connection pieces 26, which are attached to the curved surface portion 30 of the other interior panel for an aircraft 14, receive a tensile force, so that this force is received.

Furthermore, when a force in the direction orthogonal to the paper surface of FIG. 1 acts on the one interior panel for an aircraft 12, in other words, when a force, in the direction parallel with the direction the brought-together corner portions 24 of the two interior panels for an aircraft 12, 14 extend, acts in the direction along the surface of the one interior panel for an aircraft 12, the connection pieces 26 which are attached to the curved surface portion 30 of the two interior panels for an aircraft 12, 14 receive a shearing force, so that this force is received.

According to the present embodiment, the internal-side surface plates 20 of the two interior panels for an aircraft 12, 14 are provided with the plurality of connection pieces 26, and the two interior panels for an aircraft 12, 14 can be joined by a simple structure in which the connection pieces 26 are adhered to the other interior panels for an aircraft 14, 12 to be joined.

Thus, the conventionally used metal reinforcing frame, metal bolts, and metal insert nuts can be omitted, and this becomes advantageous in terms of realizing reduction in weight of the joining structure 10-1 for the two interior panels for an aircraft 12, 14.

Furthermore, as there is no need to reinforce sections of the panels in which the insert nuts are embedded, as done conventionally, and only an operation for adhering the connection pieces 26 is required, the number of parts can be reduced and the assembly becomes easy. This is also advantageous in terms of realizing cost reduction.

Furthermore, as the metal insert nuts can be omitted, sections of the core 16 that are conventionally discarded so as to have the insert nuts embedded are eliminated as well. As the discarded core is eliminated, this is also advantageous in terms of using the core 16 efficiently.

(Second Embodiment)

Next, a second embodiment will be described with reference to FIGS. 5 to 8.

Note that when the following embodiments are described below, the same reference numbers will be assigned to the same sections and components as those of the first embodiment, and descriptions for those sections and components will be omitted.

Figure 5:
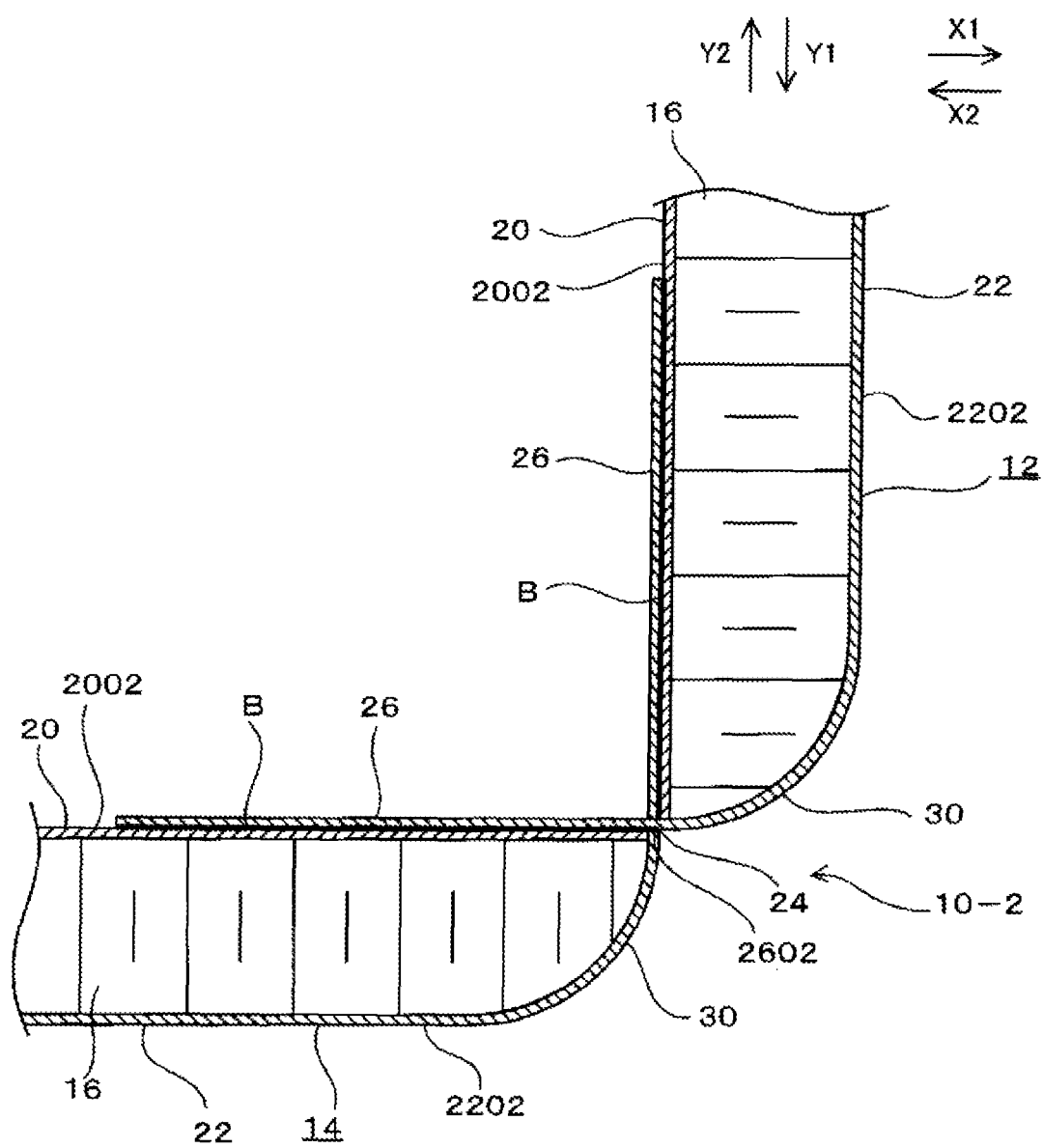
FIG. 5 is a cross-sectional view illustrating a section in which the two interior panels for an aircraft are joined by a joining structure according to a second embodiment.
Figure 6:
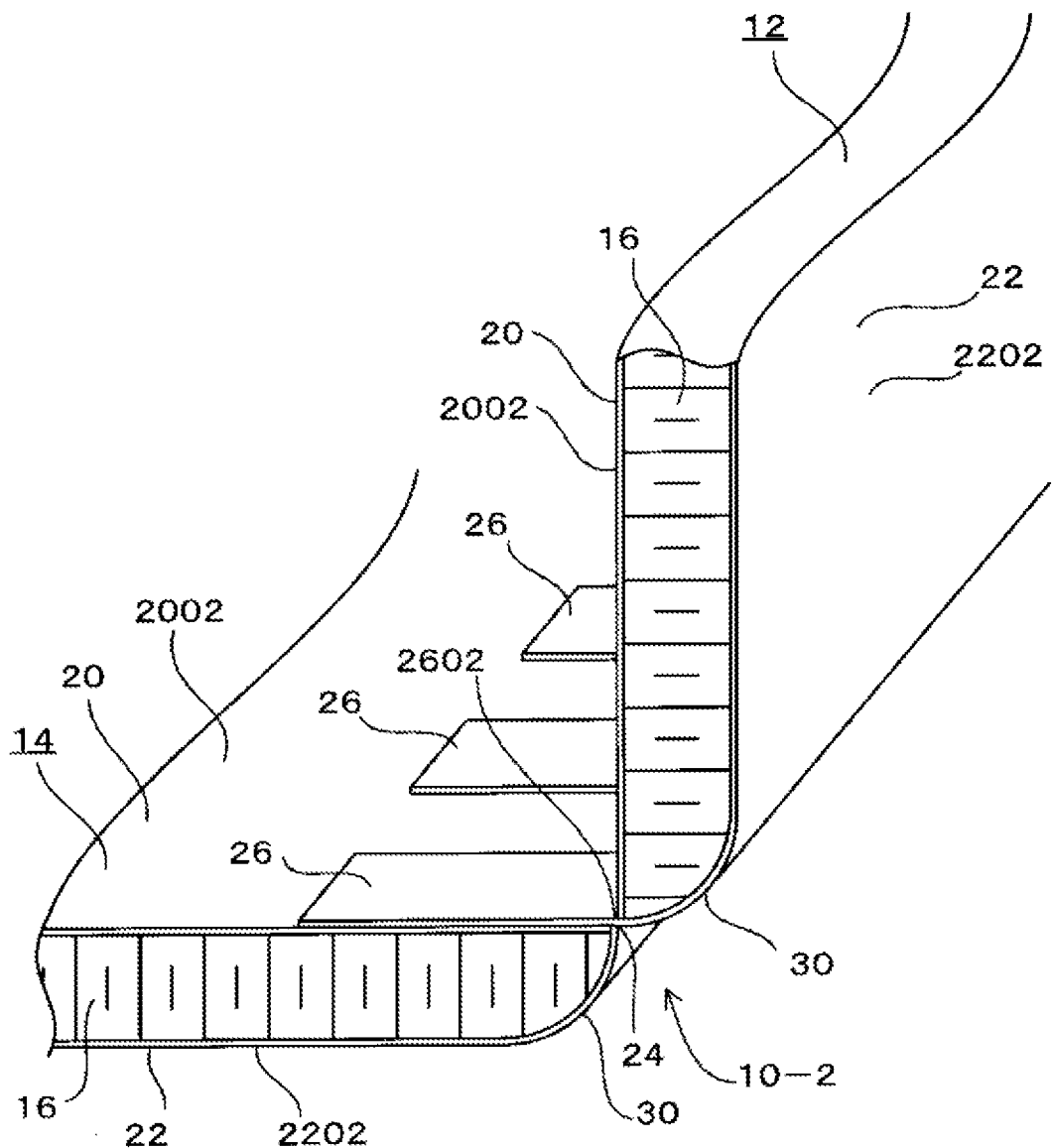
FIG. 6 is a perspective cross-sectional view illustrating the section in which the two interior panels for an aircraft are joined.
Figure 7:
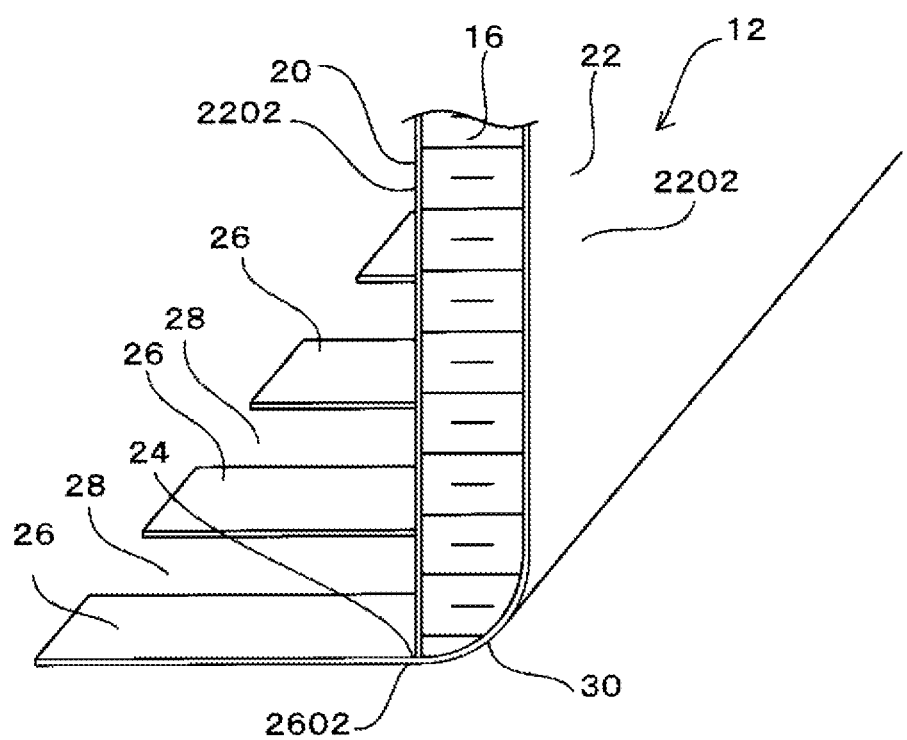
FIG. 7 is a perspective cross-sectional view illustrating an end portion of one of the interior panels for an aircraft.
Figure 8:
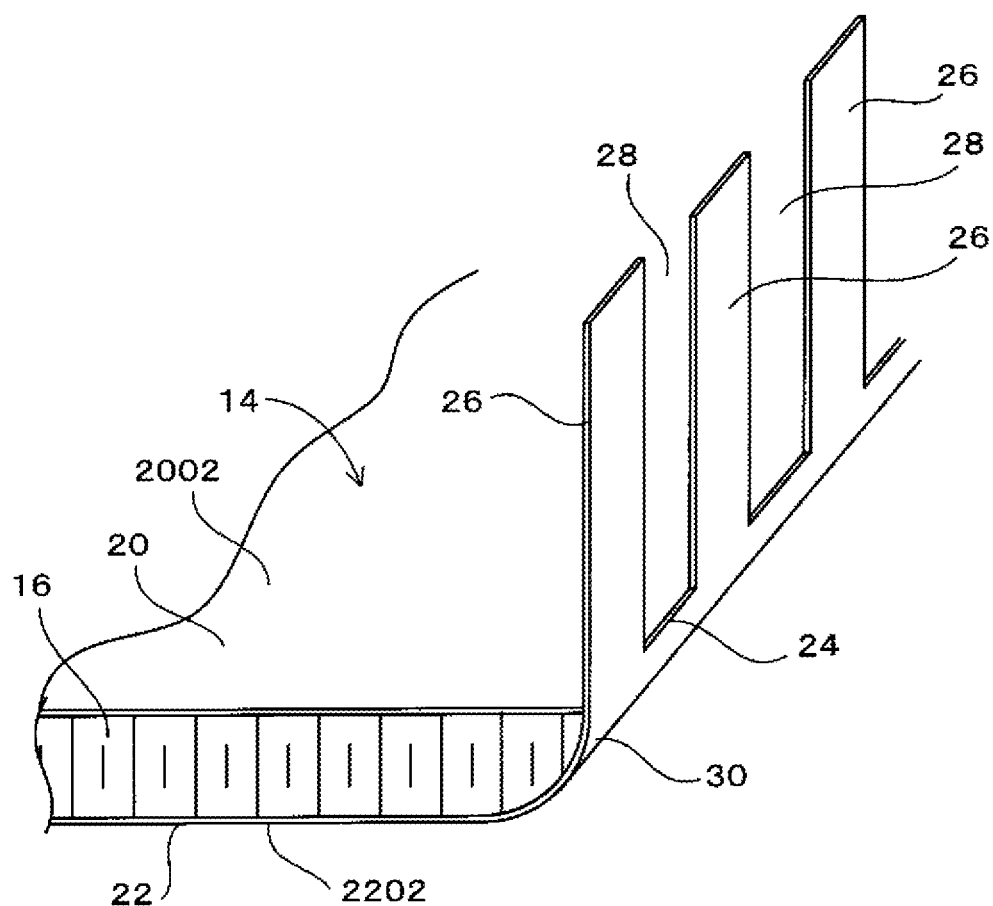
FIG. 8 is a perspective cross-sectional view illustrating an end portion of the other interior panel for an aircraft.

The two interior panels for an aircraft 12, 14 are joined by a joining structure 10-2 of the second embodiment, as illustrated in FIG. 5 and FIG. 6.

The second embodiment is different from the first embodiment in that the connection pieces 26 of the two interior panels for an aircraft 12, 14 are provided on the external-side surface plates 22 and also in that the connection pieces 26 are adhered to sections of the internal-side surface plates 20 of the other interior panels for an aircraft 14, 12 to be joined.

More specifically, in the second embodiment, the plurality of strip-shaped connection pieces 26 are provided, the connection pieces 26 being formed across the entire length of the corner portions 24 of the two interior panels for an aircraft 12, 14 by portions of the end portion of the external-side surface plate 22 protruding from the corner portions 24, in other words, formed by portions of an end portion of the curved surface portion 30 continuously protruding from the curved surface portion 30, with the gaps 28 between the strip-shaped connection pieces 26 in the direction the corner portions 24 extend.

Then, the two interior panels for an aircraft 12, 14 are joined by the corner portions 24 of the two interior panels for an aircraft 12, 14 being brought together, and the connection pieces 26 of the two interior panels for an aircraft 12, 14 passing through the gaps 28 between the connection pieces 26 of the other interior panels for an aircraft 14, 12 to be joined, and being attached to the flat surface portion 2002 of the internal-side surface plate 20 of the other interior panels for an aircraft 14, 12 by the adhesive B.

The base portion 2602 of the connection pieces 26 protruding from the corner portion 24 does not have any bent portion, and the connection pieces 26 extend continuously from the curved surface portion 30.

The same effects as the first embodiment are also exhibited by the second embodiment.

More specifically, as illustrated in FIG. 5, when the force in the direction X1 or the force in the direction X2 acts on the one interior panel for an aircraft 12, the bending moment thus generated is released by the base portions 2602 of the connection pieces 26 of the two interior panels for an aircraft 12, 14 being bent.

More specifically, when the force in the direction X1 or X2 acts on the one interior panel for an aircraft 12, the joining structure 10-2 of the present embodiment functions as if it were a pin connection.

Furthermore, when the force in the direction Y1 acts on the one interior panel for an aircraft 12, the curved surface portion 30 of the other interior panel for an aircraft 14 receives a compression force, so that this force is received.

Furthermore, when the force in the Y2 direction acts on the one interior panel for an aircraft 12, the curved surface portion 30 of the other interior panel for an aircraft 14 receives a tensile force, so that this force is received.

Furthermore, when the force in the direction orthogonal to the paper surface of FIG. 1 acts on the one interior panel for an aircraft 12, the connection pieces 26, which are attached to the flat surface portions 2002 of the two interior panels for an aircraft 12, 14, receive a shearing force, so that this force is absorbed.

Thus, according to the second embodiment also, the conventionally used metal reinforcing frame, metal bolts, and metal insert nuts can be omitted, and this becomes advantageous in terms of realizing reduction in weight of the joining structure 10-2. Furthermore, as there is no need to reinforce the sections of the panels in which the insert nuts are embedded, as done conventionally and only the operation for adhering the connection pieces 26 is required, the number of parts can be reduced and the assembly becomes easy. This is also advantageous in terms of realizing cost reduction.

(Third Embodiment)

Next, a third embodiment will be described with reference to FIG. 9.

Figure 9:
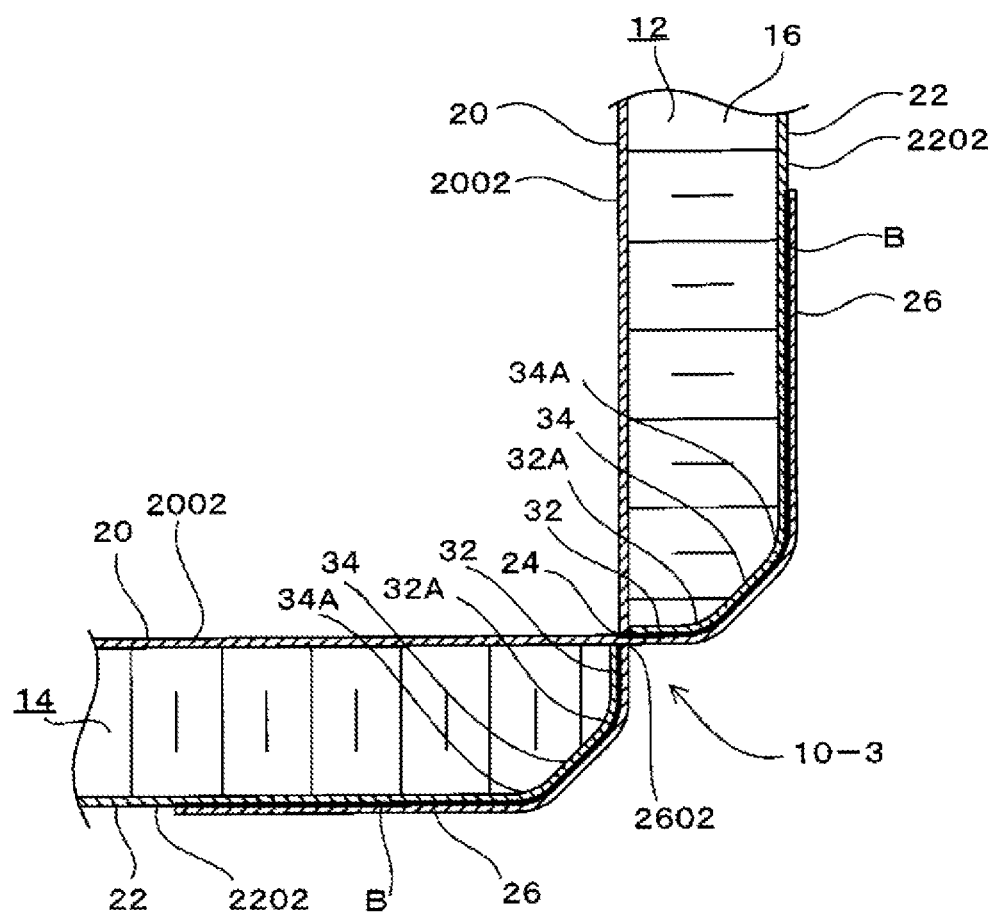
FIG. 9 is a cross-sectional view illustrating a section in which the two interior panels for an aircraft are joined by a joining structure according to a third embodiment.

The two interior panels for an aircraft 12, 14 are joined by a joining structure 10-3 of the third embodiment, as illustrated in FIG. 9.

In the third embodiment, a shape of the end portions of the interior panels for an aircraft 12, 14 is different from those of the first and second embodiments.

In the third embodiment, the external-side surface plate 22 has the flat surface portion 2202 that is parallel with the flat surface portion 2002 of the internal-side surface plate 20 and the end surface portion that protrudes from the end portion of the flat surface portion 2202 and connects with the flat surface portion 2002 of the internal-side surface plate 20. This end surface portion is provided with a first end surface portion 32, which is formed by a flat surface that orthogonally intersects with the flat surface portion 2002 of the internal-side surface plate 20 at the corner portion 24, and a second end surface portion 34, which is connected with the first end surface portion 32 at an obtuse angle and is formed by a flat surface that connects with the flat surface portion 2202 of the external-side surface plate 22.

The first end surface portion 32 and the second end surface portion 34 are connected via a curved portion 32A, and the second end surface portion 34 and the flat surface portion 2202 are connected via a curved portion 34A.

The connection pieces 26 are formed by the portions of the end portion of the flat surface portion 2002 of the internal-side surface plate 20 protruding from the corner portion 24.

The connection pieces 26 of the two interior panels for an aircraft 12, 14 pass through the gaps 28 between the connection pieces 26 of the other interior panels for an aircraft 14, 12 to be joined and are attached to the first end surface portion 32, the second end surface portion 34, and the flat surface portion 2202 of the external-side surface plate 22, of the other interior panels for an aircraft 14, 12.

The base portion 2602 of the connection pieces 26 protruding from the corner portion 24 does not have any bent portion, and the connection pieces 26 extend continuously from the flat surface portion 2002 of the internal-side surface plate 20.

As the curved portions 32A, 34A are provided on the end portion of the interior panels for an aircraft 12, 14 in the present embodiment, the connection pieces 26 do not have any bent portions, thereby preventing a reduction in strength of the connection pieces 26 caused by the bent portions.

The same effects as the first embodiment are also exhibited by the third embodiment.

(Fourth Embodiment)

Next, a fourth embodiment will be described with reference to FIG. 10.

Figure 10:
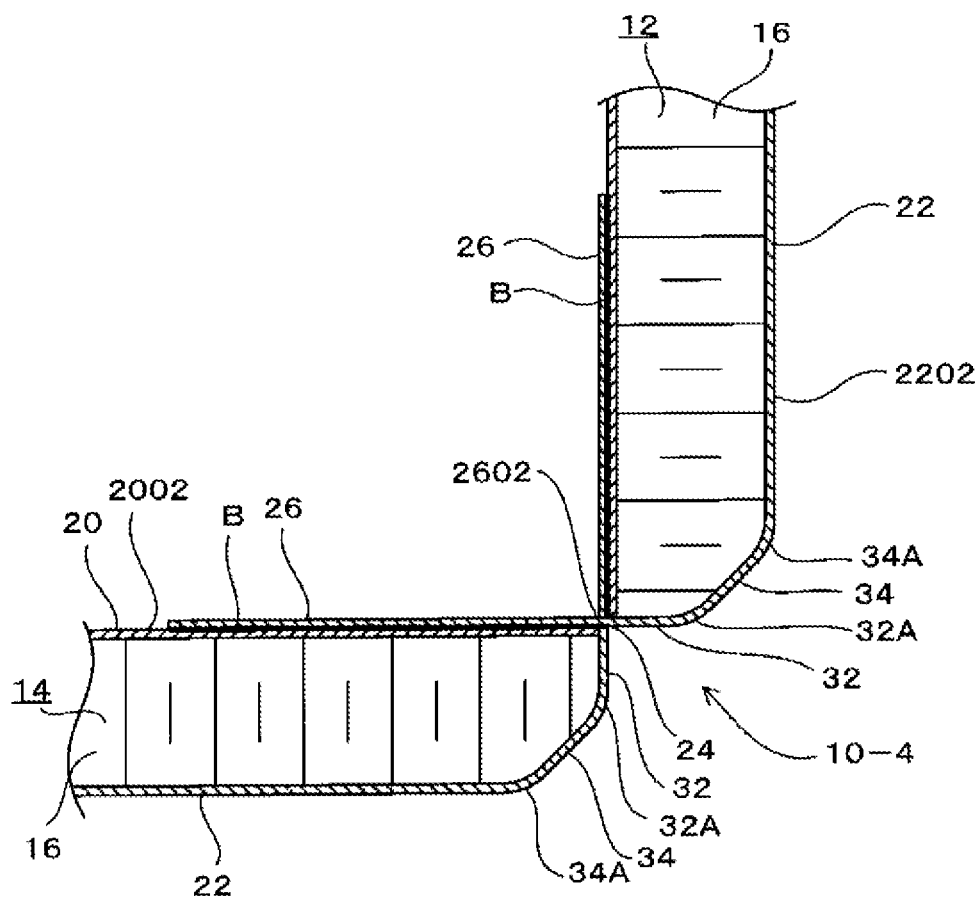
FIG. 10 is a cross-sectional view illustrating a section in which the two interior panels for an aircraft are joined by a joining structure according to a fourth embodiment.

The two interior panels for an aircraft 12, 14 are joined by a joining structure 10-4 of the fourth embodiment, as illustrated in FIG. 10.

The fourth embodiment is different from the third embodiment in that the connection pieces 26 are provided on the external-side surface plate 22.

More specifically, the connection pieces 26 are formed by portions of the external-side surface plate 22, namely, portions of the end portion of the first end surface portion 32 protruding from the corner portion 24.

The connection pieces 26 of the two interior panels for an aircraft 12, 14 pass through the gaps 28 between the connection pieces 26 of the other interior panels for an aircraft 14, 12 to be joined and are attached to the flat surface portion 2002 of the internal-side surface plate 20 of the other interior panels for an aircraft 14, 12.

The base portion 2602 of the connection pieces 26 protruding from the corner portion 24 does not have any bent portion, and the connection pieces 26 extend continuously from the first end surface portion 32.

The same effects as the second embodiment are also exhibited by the fourth embodiment.

Note that, although cases have been described in which the number of the second end surface portion 34, which connects the first end surface portion 32 with the flat surface portion 2202 of the external-side surface plate 22, is one in the third and fourth embodiments, the number of the second end surface portion 34 may be two or more, and the end portions of the interior panels for an aircraft 12, 14 may have a polygonal cross-section, for example.

(Fifth Embodiment)

Next, a fifth embodiment will be described with reference to FIG. 11.

Figure 11:
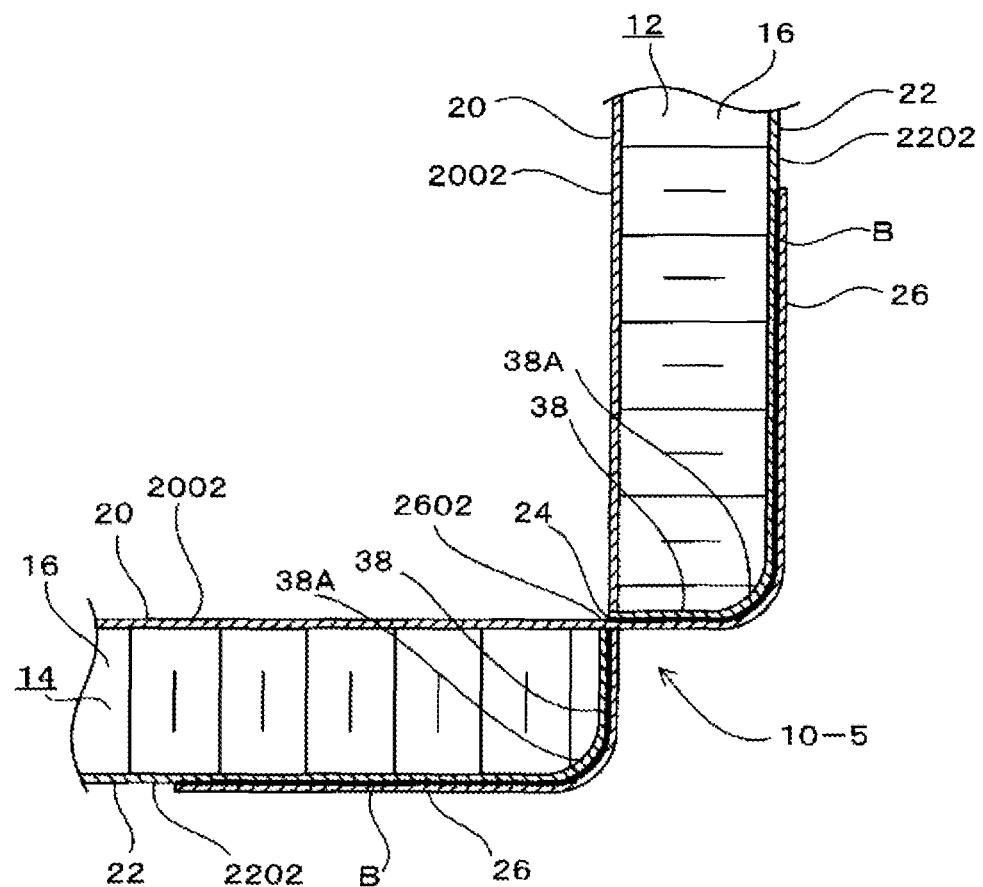
FIG. 11 is a cross-sectional view illustrating a section in which the two interior panels for an aircraft are joined by a joining structure according to a fifth embodiment.

The two interior panels for an aircraft 12, 14 are joined by a joining structure 10-5 of the fifth embodiment, as illustrated in FIG. 11.

In the fifth embodiment, the shape of the end portions of the interior panels for an aircraft 12, 14 is different from those of the first to fourth embodiments.

In the fifth embodiment, the external-side surface plate 22 has the flat surface portion 2202 that is parallel with the flat surface portion 2002 of the internal-side surface plate 20 and the end surface portion that protrudes from the end portion of the flat surface portion 2202 and connects with the flat surface portion 2002 of the internal-side surface plate 20. The end surface portion is provided as an end surface portion 38 that is formed by a flat surface which orthogonally intersects with the flat surface portion 2002 of the internal-side surface plate 20 at the corner portion 24 and is orthogonally connected with the flat surface portion 2202 of the external-side surface plate 22.

The end surface portion 38 and the flat surface portion 2202 are connected via a curved portion 38A.

The connection pieces 26 are formed by the portions of the end portion of the flat surface portion 2002 of the internal-side surface plate 20 protruding from the corner portion 24.

The connection pieces 26 of the two interior panels for an aircraft 12, 14 pass through the gaps 28 between the connection pieces 26 of the other interior panels for an aircraft 14, 12 to be joined and are attached to the end surface portion 38 and the flat surface portion 2202 of the external-side surface plate 22, of the other interior panels for an aircraft 14, 12.

The base portion 2602 of the connection pieces 26 protruding from the corner portion 24 does not have any bent portion, and the connection pieces 26 extend continuously from the flat surface portion 2002 of the internal-side surface plate 20.

As the curved portion 38A is provided on the end portion of the interior panels for an aircraft 12, 14 in the present embodiment, the connection pieces 26 do not have any bent portions, thereby preventing a reduction in strength of the connection pieces 26 caused by the bent portions.

The same effects as the first and third embodiments are also exhibited by the fifth embodiment.

(Sixth Embodiment)

Next, a sixth embodiment will be described with reference to FIG. 12.

Figure 12:
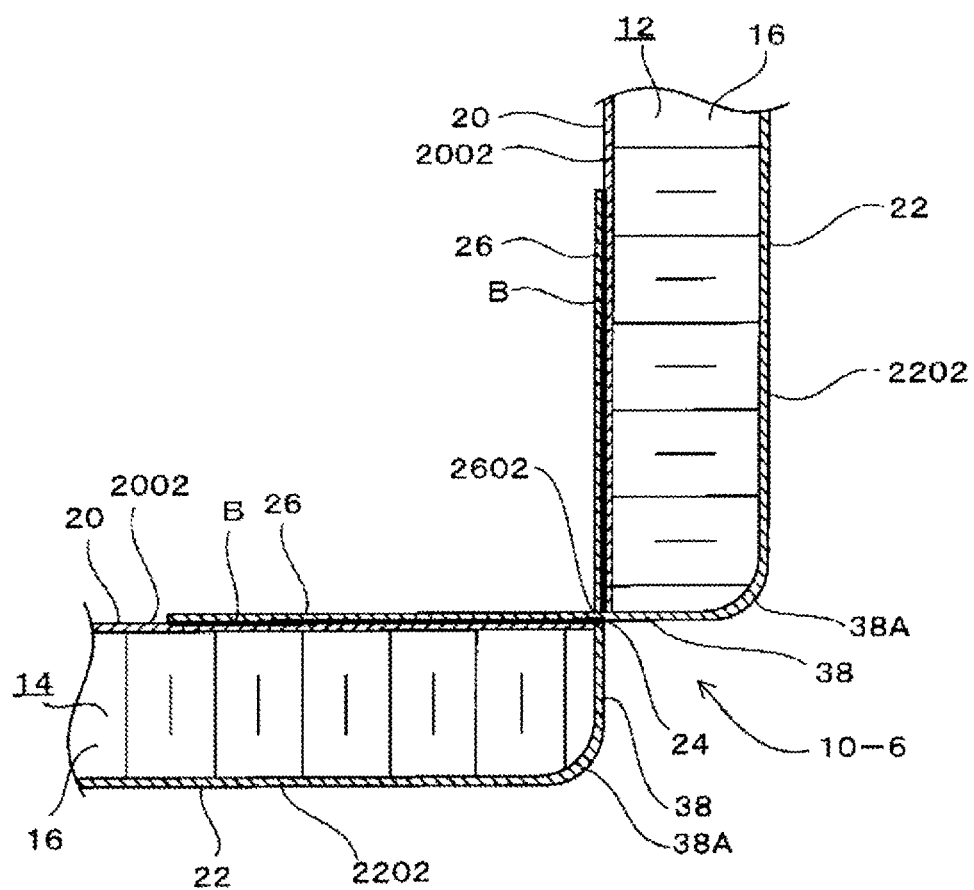
FIG. 12 is a cross-sectional view illustrating a section in which the two interior panels for an aircraft are joined by a joining structure according to a sixth embodiment.

The two interior panels for an aircraft 12, 14 are joined by a joining structure 10-6 of the sixth embodiment, as illustrated in FIG. 12.

The sixth embodiment is different from the fifth embodiment in that the connection pieces 26 are provided on the external-side surface plate 22.

More specifically, the connection pieces 26 are formed by the portions of the external-side surface plate 22, namely, portions of an end portion of the end surface portion 38 protruding from the corner portion 24.

The connection pieces 26 of the two interior panels for an aircraft 12, 14 pass through the gaps 28 between the connection pieces 26 of the other interior panels for an aircraft 14, 12 to be joined and are attached to the flat surface portion 2002 of the internal-side surface plate 20 of the other interior panels for an aircraft 14, 12.

The base portion 2602 of the connection pieces 26 protruding from the corner portion 24 does not have any bent portion, and the connection pieces 26 extend continuously from the end surface portion 38.

The same effects as the second and fourth embodiments are also exhibited by the sixth embodiment.

(Seventh Embodiment)

Next, a seventh embodiment will be described with reference to FIG. 13.

Figure 13:
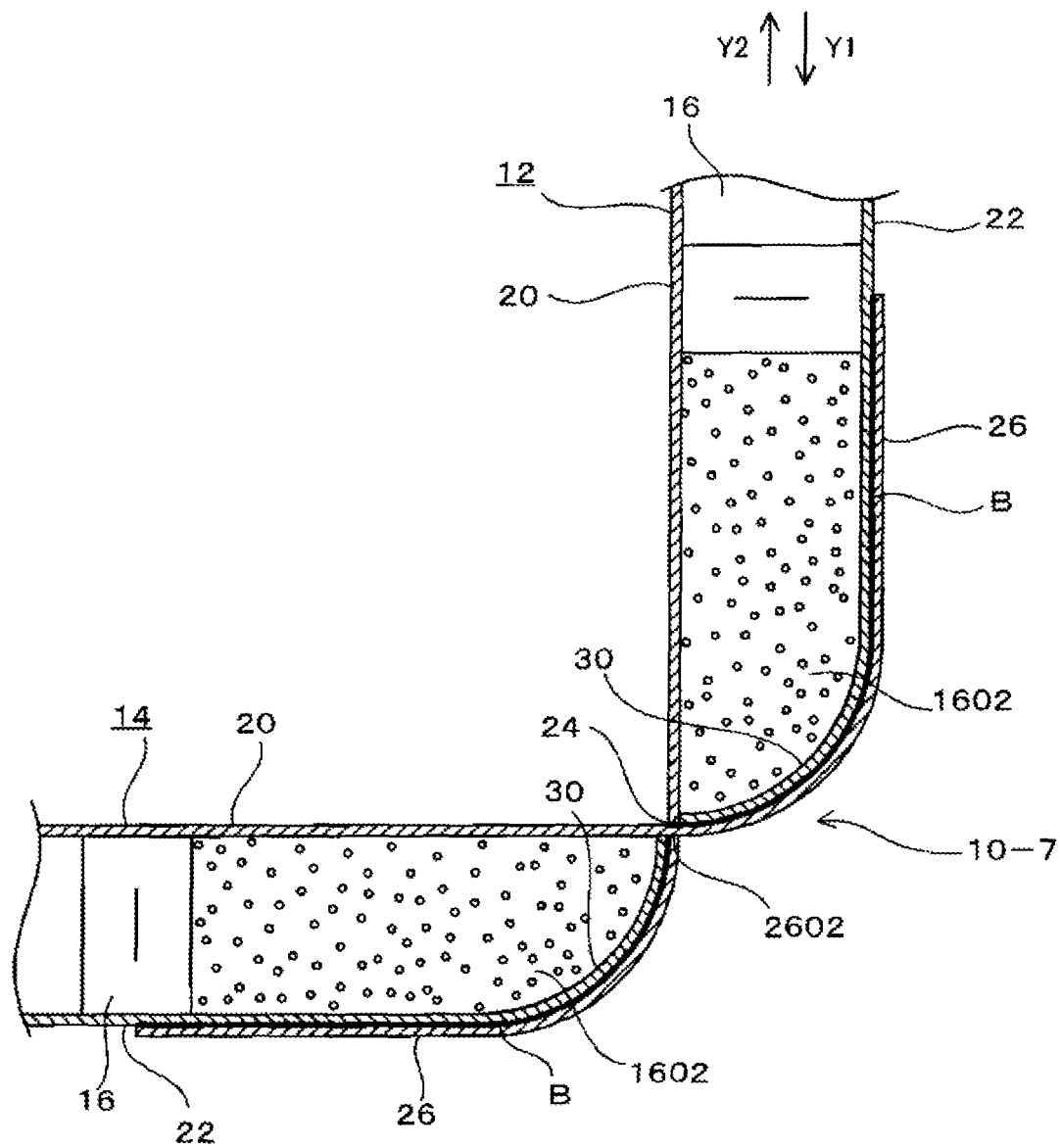
FIG. 13 is a cross-sectional view illustrating a section in which the two interior panels for an aircraft are joined by a joining structure according to a seventh embodiment.

The two interior panels for an aircraft 12, 14 are joined by a joining structure 10-7 of the seventh embodiment, as illustrated in FIG. 13.

In the seventh embodiment, a material of the core 16 that forms the end portion of the interior panels for an aircraft 12, 14 is different from those of the first to sixth embodiments.

Although the two interior panels for an aircraft 12, 14 are joined by the same structure as the joining structure 10-1 of the first embodiment in an example illustrated in FIG. 13, cores 1602, which form the end portions at which the corner portions 24 of the interior panels for an aircraft 12, 14 are provided, are formed of a material having higher compression strength than that of the cores 16 forming the remaining portion of the interior panels for an aircraft 12, 14.

Various conventionally known materials, such as urethane resin, can be used as such material having high compression strength.

According to the seventh embodiment, when a large load is applied in the direction Y1 or Y2, there is an advantage in which the load can be also received by the end portion of the interior panels for an aircraft 12, 14.

(Eighth Embodiment)

Next, an eighth embodiment will be described with reference to FIG. 14.

Figure 14:
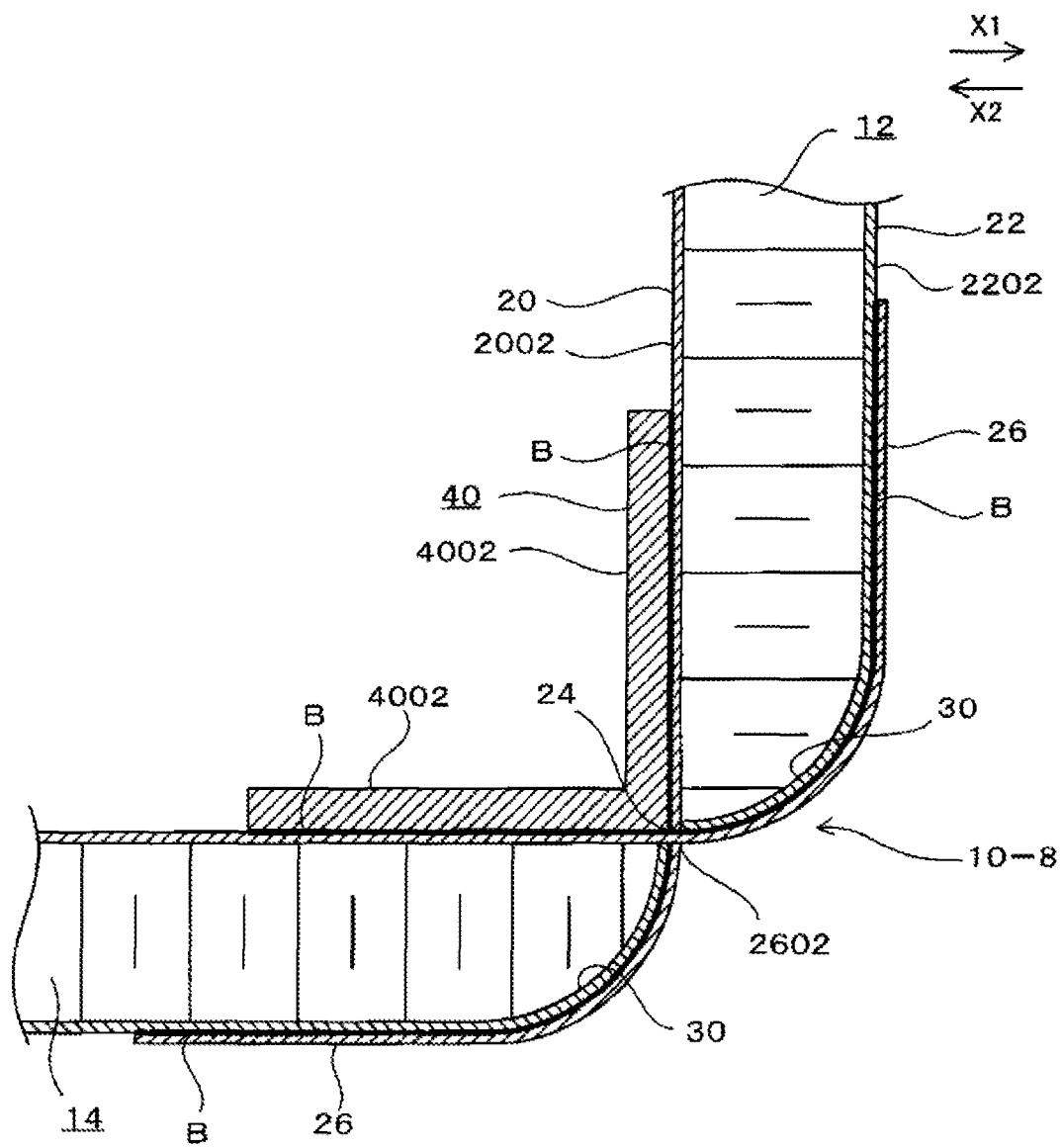
FIG. 14 is a cross-sectional view illustrating a section in which the two interior panels for an aircraft are joined by a joining structure according to an eighth embodiment.

The two interior panels for an aircraft 12, 14 are joined by a joining structure 10-8 of the eighth embodiment, as illustrated in FIG. 14.

The eighth embodiment is different from the first to seventh embodiments in that a reinforcing member 40 is provided.

In an example illustrated in FIG. 14, the two interior panels for an aircraft 12, 14 are joined by the joining structure 10-1 of the first embodiment so as to intersect at an angle of 90°, and the reinforcing member 40, having an L-shaped cross-section and formed by two flanges 4002, 4002 being orthogonal, is arranged in a section at which the two interior panels for an aircraft 12, 14 orthogonally intersect.

Fiber reinforced plastic, reinforced plastic, a lightweight metal plate formed of aluminum alloy, or the like, is used as the reinforcing member 40.

The two respective flanges 4002 are attached to the internal-side surface plates 20 of the two interior panels for an aircraft 12, 14 by the adhesive B.

Note that the reinforcing member 40 may extend over the entire length of the corner portion 24, or a plurality of reinforcing members 40 may be provided at intervals in the direction the corner portion 24 extends.

According to the eighth embodiment, when a large load is applied in the direction X1 or X2, there is an advantage in which the load can be received by the reinforcing member 40.

Note that although, in the above-described embodiments, cases have been described in which the two interior panels for an aircraft 12, 14 are joined so as to intersect at the angle of 90°, it is needless to say that the joining structure for the interior panel for an aircraft according to the present technology can be applied to a case in which the two interior panels for an aircraft 12, 14 are joined so as to intersect at an acute or obtuse angle.

What is claimed is:

1. A joining structure for an interior panel for an aircraft, comprising:
two interior panels for the aircraft each including a plate-shaped core having a uniform thickness and a first surface plate and a second surface plate attached to both sides of the core, the two interior panels being joined so that the first surface plates intersect with each other and the second surface plates intersect with each other; wherein
the first surface plate and the second surface plate have a flat surface portion, the flat surface portions being parallel with each other;
the second surface plate has an end surface portion that protrudes from an end portion of the flat surface portion and is connected with an end portion of the flat surface portion of the first surface plate as well as the flat surface portion;
a corner portion is provided by the end portion of the flat surface portion of the first surface plate and an end portion of the end surface portion of the second surface plate being attached, the corner portion extending in a direction the end portions extend;
a plurality of strip-shaped connection pieces are provided, the connection pieces being formed across an entire length of the corner portions of the two interior panels by portions of the end portion of the flat surface portion of the first surface plate protruding from the corner portion and continuously protruding from the flat surface portion of the first surface plate or by portions of the end portion of the end surface portion of the second surface plate continuously protruding from the end surface portion, and the connection pieces having gaps therebetween in a direction the corner portion extends; and
the two interior panels are joined by the corner portions of the two interior panels being brought together, and the connection pieces of the two interior panels passing through the gaps between the connection pieces of the other interior panels to be joined, and being adhered to one of the second surface plate and the first surface plate of the other interior panels.

2. The joining structure according to claim 1, wherein the two interior panels to be joined are joined so that the first surface plates intersect with each other at an angle of 90°.

3. The joining structure according to claim 1, wherein the core forming the end portion, at which the corner portion, is formed of a material having a higher compression strength than that of the core forming a remaining portion of the interior panel for the aircraft.

4. The joining structure according to claim 1, wherein a reinforcing member having two flanges is arranged in a section at which the two interior panels intersect, and the two respective flanges are attached to the first surface plates of the two interior panels.

5. The joining structure according to claim 1, wherein the end surface portion is formed as a curved surface portion, the curved surface portion being curved so as to gradually separate from the flat surface portion of the first surface plate as the curved surface portion separates from the corner portion and connected with the flat surface portion of the second surface plate.

6. The joining structure according to claim 1, wherein the end surface portion is provided with a first end surface portion formed by a flat surface intersecting with the flat surface portion of the first surface plate at the corner portion and with a second end surface portion formed by at least one of one flat surface and a plurality of flat surfaces that connect the first end surface portion with the flat surface portion of the second surface plate.

7. The joining structure according to claim 1, wherein the end surface portion is provided with a flat surface portion that orthogonally intersects the flat surface portion of the first surface plate at the corner portion.

8. The joining structure according to claim 1, wherein the connection pieces of the two interior panels to be joined are formed having a uniform width.

9. The joining structure according to claim 8, wherein the two interior panels to be joined are joined so that the first surface plates intersect with each other at an angle of 90°.

10. The joining structure according to claim 9, wherein the core forming the end portion, at which the corner portion of the interior panel is provided, is formed of a material having a higher compression strength than that of the core forming a remaining portion of the interior panel for the aircraft.

11. The joining structure according to claim 10, wherein a reinforcing member having two flanges is arranged in a section at which the two interior panels intersect, and the two respective flanges are attached to the first surface plates of the two interior panels.

12. The joining structure according to claim 11, wherein the end surface portion is formed as a curved surface portion, the curved surface portion being curved so as to gradually separate from the flat surface portion of the first surface plate as the curved surface portion separates from the corner portion and connected with the flat surface portion of the second surface plate.

13. The joining structure according to claim 11, wherein the end surface portion is provided with a first end surface portion formed by a flat surface intersecting with the flat surface portion of the first surface plate at the corner portion and with a second end surface portion formed by at least one of one flat surface and a plurality of flat surfaces that connect the first end surface portion with the flat surface portion of the second surface plate.

14. The joining structure according to claim 11, wherein the end surface portion is provided with a flat surface portion that orthogonally intersects the flat surface portion of the first surface plate at the corner portion.

* * * * *